(12) United States Patent
Cheek

(10) Patent No.: US 12,728,665 B2
(45) Date of Patent: Sep. 8, 2026

(54) CUSTOMIZABLE TEACHING CUBOID

(71) Applicant: LaCenia Cheek, Fort Mill, SC (US)

(72) Inventor: LaCenia Cheek, Fort Mill, SC (US)

( * ) Notice: Subject to any disclaimer, the term of this patent is extended or adjusted under 35 U.S.C. 154(b) by 521 days.

(21) Appl. No.: 18/310,926

(22) Filed: May 2, 2023

(65) Prior Publication Data

US 2024/0367456 A1 Nov. 7, 2024

(51) Int. Cl.

*B43L 1/00* (2006.01)
*A63H 33/00* (2006.01)
*G09B 3/00* (2006.01)
*G09F 19/00* (2006.01)

(52) U.S. Cl.

CPC ................ *B43L 1/00* (2013.01); *A63H 33/00* (2013.01); *G09B 3/00* (2013.01); *G09F 19/00* (2013.01)

(58) Field of Classification Search

CPC .. B43L 1/00; G09F 19/00; G09B 3/00; A63H 33/00

See application file for complete search history.

(56) References Cited

U.S. PATENT DOCUMENTS 346,838 A 8/1886 Butler et al.
798,337 A * 8/1905 Hammarlund ......... A63H 33/26 434/188
2,637,438 A * 5/1953 Menz ..................... A44C 23/00 428/3
3,229,388 A * 1/1966 Smith .................... G09B 19/02 434/195
3,596,373 A * 8/1971 Morgan ................... G09B 7/10 434/338
3,638,949 A 2/1972 Thompson
3,757,322 A * 9/1973 Barkan .................. H03K 17/98 434/335
4,114,290 A * 9/1978 Cooper .................. G09B 19/02 273/145 CA
D262,899 S 2/1982 Kroll
4,398,086 A * 8/1983 Smith, III ................. A63F 9/24 235/419
4,494,756 A 1/1985 Winer
4,509,920 A 4/1985 Kaufmann
4,992,068 A 2/1991 Conrad
5,160,267 A * 11/1992 Drake ...................... G09B 3/04 434/348
6,010,339 A 1/2000 McDonald
6,152,740 A 11/2000 Corrado (Continued)

FOREIGN PATENT DOCUMENTS

WO WO-2006094457 A1 * 9/2006 ......... A63F 3/00643
WO WO-2007082415 A1 * 7/2007 ........... A63F 9/0861

*Primary Examiner* — Kang Hu
(74) *Attorney, Agent, or Firm* — Dunlap Bennett & Ludwig PLLC

(57) ABSTRACT

A cuboid teaching tool that provides a display surface along each of its lateral faces, thereby providing a method of teaching children vital contact information in bite-size chunks. Each display surface can provide a portion of the contact information on each of the display surfaces. Each display surface includes an erasable writing surface. Each display surface is slidable along a pair of receiving slots recessed within the respective lateral face. The display surface can move along the receiving slots between a closed condition and an opened condition that provides access to an internal storage compartment defined by the cuboid.

8 Claims, 3 Drawing Sheets

(56) References Cited

U.S. PATENT DOCUMENTS

| | | | | |
|---|---|---|---|---|
| 6,179,682 | B1 | 1/2001 | Plain et al. | |
| 6,215,978 | B1 * | 4/2001 | Ruzic | A63H 5/00 273/153 R |
| 6,882,824 | B2 | 4/2005 | Wood | |
| 6,997,773 | B1 | 2/2006 | DuBois et al. | |
| 7,309,233 | B2 | 12/2007 | Nguyen | |
| 8,911,276 | B2 | 12/2014 | Kim et al. | |
| 9,475,104 | B2 * | 10/2016 | Croteau | B65D 85/00 |
| 10,486,458 | B2 | 11/2019 | O'Connor | |
| 2004/0219496 | A1 | 11/2004 | Stevinson | |
| 2008/0050705 | A1 * | 2/2008 | Buhrman | G09B 23/02 434/188 |
| 2015/0224391 | A1 | 8/2015 | Adeyemo et al. | |
| 2016/0184993 | A1 * | 6/2016 | Brandwijk | B25J 9/101 463/31 |
| 2016/0324725 | A1 * | 11/2016 | Horn | B65D 25/205 |
| 2019/0392722 | A1 | 12/2019 | Commissariat et al. | |

* cited by examiner

CUSTOMIZABLE TEACHING CUBOID

BACKGROUND OF THE INVENTION

The present invention relates to educational toys and more particularly, to a customizable communication cuboid that embodies a teaching tool that allows people, especially kids, to learn important information in bite sized chunks.

Teaching one's child important contact information can keep them safe during an emergency, or even save their life if they get lost or need help from someone else. To teach them to memorize their home address and home phone numbers numerous devices of varying complexity are currently available. Yet ultimately what is required of children is, first, memorization of bite-size chunks of numbers and letters, even before they can read or perform arithmetic.

Devices such as flash cards to practice and test the learning of contact information facts are well known. Sing-song approaches, such as crafting a jingle have been used. Electronic devices and computer programs are also known devices used to teach contact information facts to children.

While the known prior art devices accomplish their goals to varying degrees, all require the child to focus on mastering the given task, which may be appropriate for older or more academically advanced children; however, none of the solutions, focus on providing a child simple familiarity with numbers and words while engaged in playing with a manipulative cuboid that serves a secondary purpose-which also engages young children—providing a storage container offering a variety of access points.

A need exists for a customizable communication cuboid for teaching kids contact information.

SUMMARY OF THE INVENTION

The apparatus comprises an educational toy cuboid configured, in one embodiment, to help young children memorize critical contact information in an engaging, playful environment. The toy cuboid may include a customizable display surface along each of the lateral faces of the toy cuboid to facilitate teaching children one or more portions of the contact information. In a further embodiment, the toy cuboid sequentially displays one or more portions of the contact information along a consecutive series of the facial display surface, forming a relationship of the portions of the contact information so that a user can digest the whole.

The toy cuboid, in one embodiment, comprises a polygonal-shaped hollow cuboid having a plurality of faces, wherein each side or lateral face features a display surface, such as a chalk board or dry erase board that a user can write or draw on and then replace and rewrite/redraw.

In one aspect of the present invention, a cuboid teaching tool includes a polygonal shaped box, wherein each lateral face of the box provides a display surface slidable along a pair of tracks between a closed condition and an opened condition communication, to an external environment, an internal compartment defined by the box, wherein each pair of tracks is defined by a pair of receiving slots, wherein each pair of tracks starts inward from a first end of the box and terminates at a second end of the box, wherein adjacent the second end, each pair of receiving slots define a pair of shoulders by discontinuously offsetting, wherein each display surface ends in a handle that abuts the respective pair of shoulders in the closed condition.

In another aspect of the present invention, a method of teaching a set of related information, the method includes providing a polygonal shaped box, wherein each lateral face of the box of provides a display surface slidable along tracks between a closed condition and an opened condition that provides access to an internal compartment defined by the box; and providing erasable successive portions of the set of related information on at least two successive lateral faces, wherein a first portion of the successive portions is an area code of a phone number, wherein a second portion of the successive portions is a first three digits of the phone number, and wherein third portion of the successive portions is a last four digits of the phone number.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a cuboid teaching tool that provides a display surface along each of its lateral faces, thereby providing a method of teaching children vital contact information in bite-size chunks. Each display surface can provide a portion of the contact information on each of said display surfaces. Each display surface includes an erasable writing surface. Each display surface is slidable along a pair of receiving slots recessed within the respective lateral face. The display surface can move along the receiving slots between a closed condition and an opened condition that provides access to an internal storage compartment defined by the cuboid.

Referring to FIGS. 1 through 5, the present invention may include an educational toy embodied in a customizable communication cuboid 10.

The customizable communication cuboid 10 includes a polygonal-shaped cuboid having a plurality of faces defining an internal compartment 20. The hexahedron may be elongated, wherein its quadrilaterals length is greater than its quadrilaterals width, resulting in lateral or side faces far longer than its end faces. In some embodiments, the lateral faces may extend between approximately nine and fifteen inches, while the end faces have edges extending between three and six inches. Each of the lateral faces may include a display surface 16, such as a chalk board or dry erase board, adapted to provide erasable written information 22.

Figure 1:
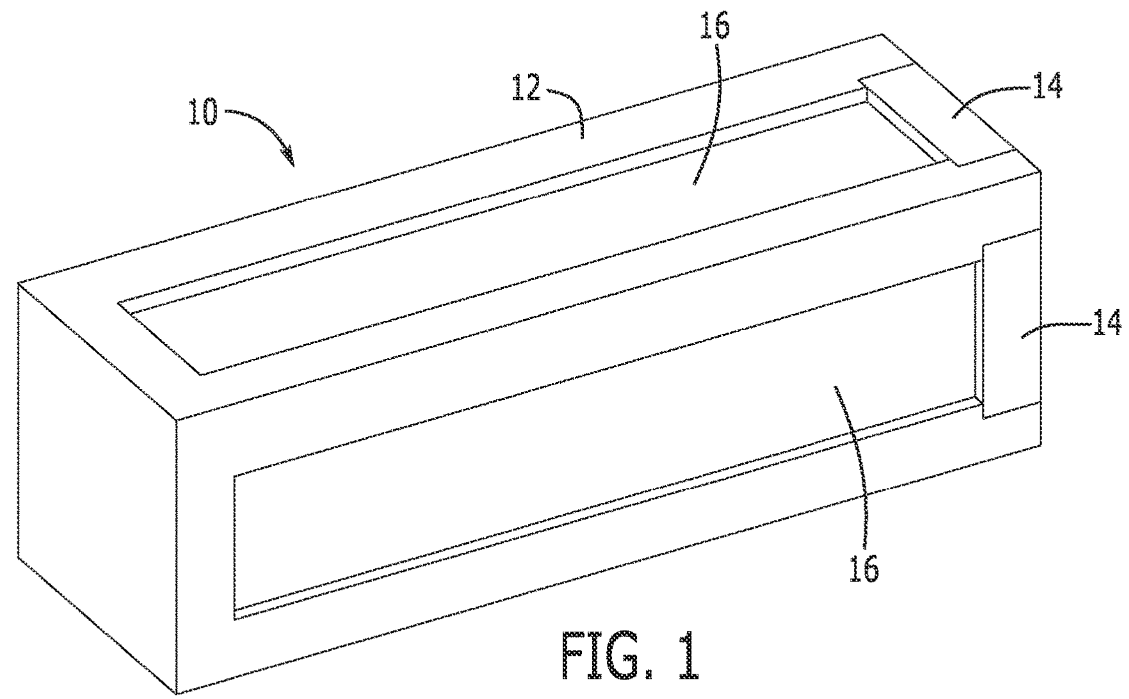
FIG. 1 is a top perspective view of an exemplary embodiment of the present invention.
Figure 2:
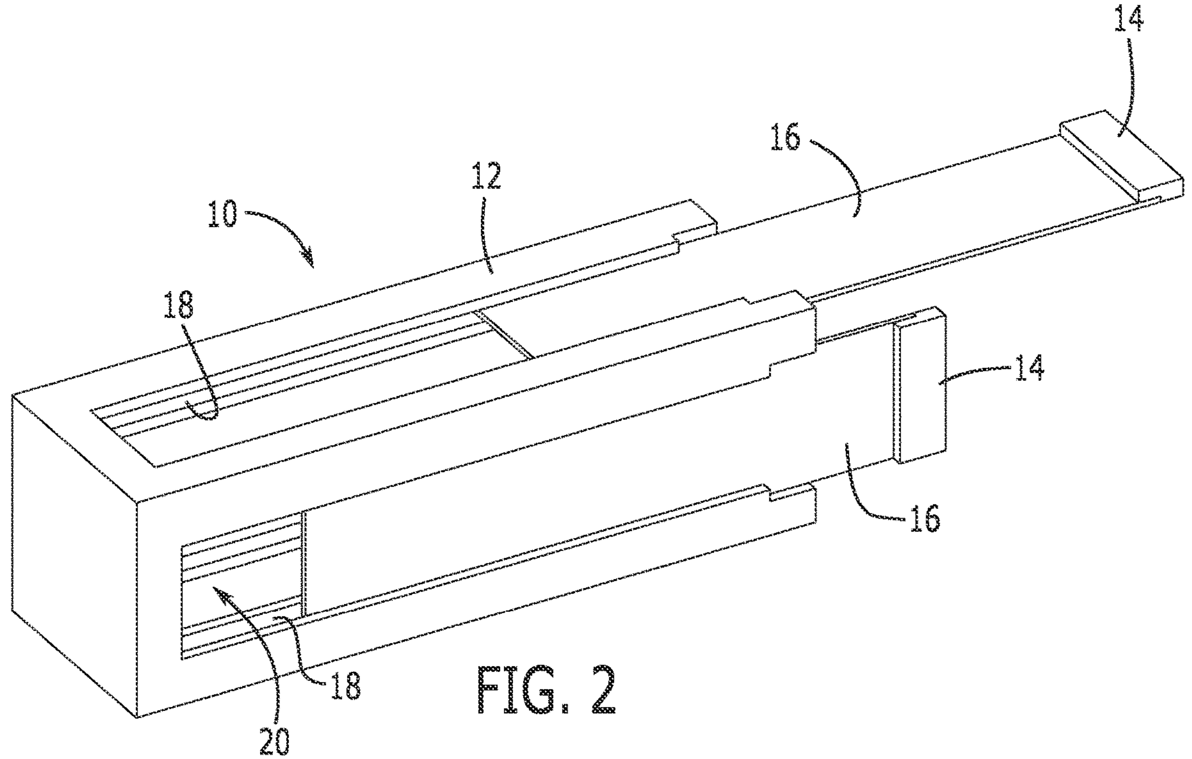
FIG. 2 is a top perspective view of an exemplary embodiment of the present invention, shown in a partially opened condition.
Figures 3, 4:
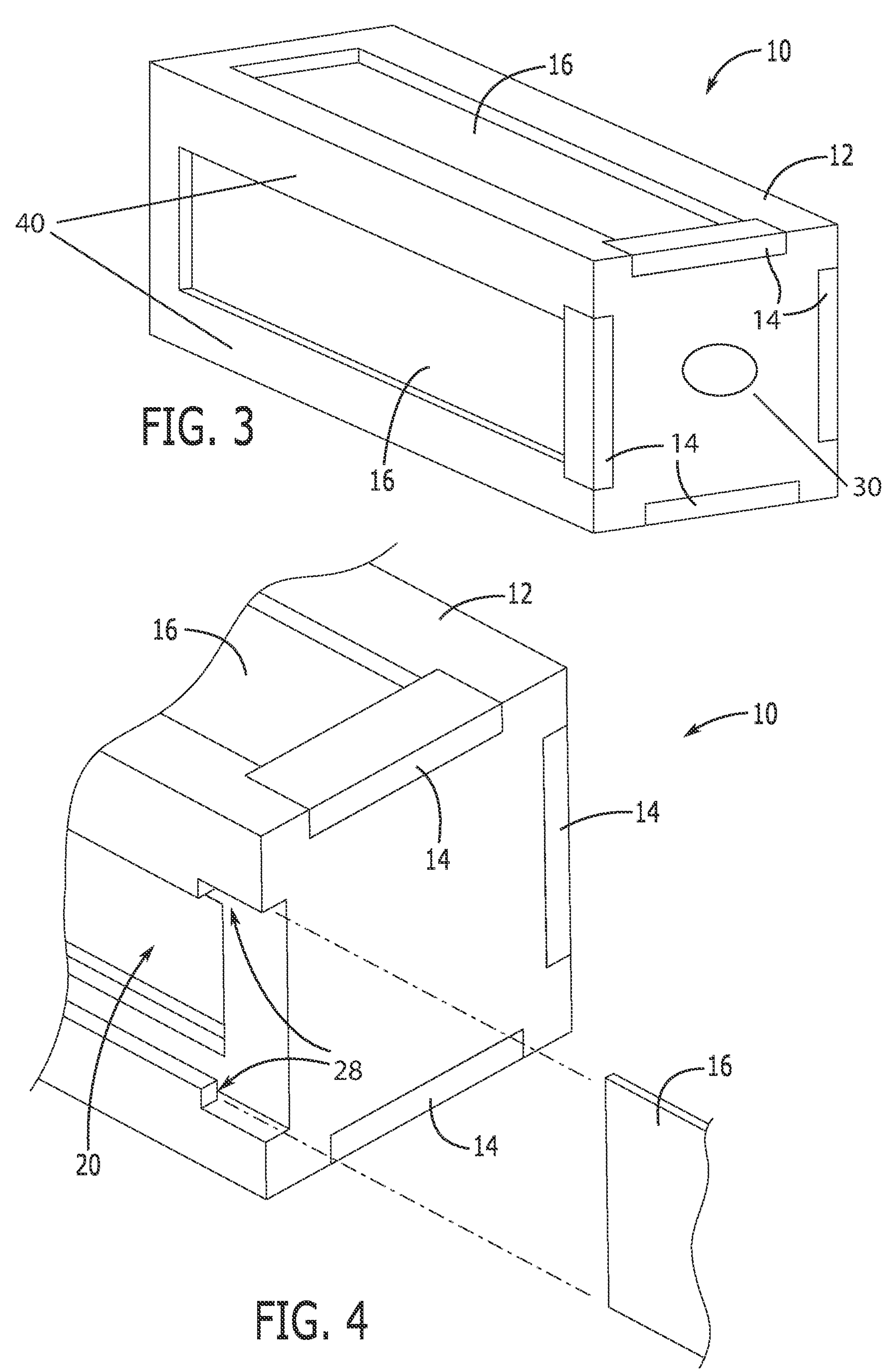
FIG. 3 is an end perspective view of an exemplary embodiment of the present invention, showing a knob 30.
FIG. 4 is a detailed exploded perspective view of an exemplary embodiment of the present invention, showing a display surface 16 disengaging receiving slots thereof.

The customizable communication cuboid 10 may be defined by a framework 12 that extends along each of the lateral edges and merges at the end faces. Between each two adjacent lateral portions 40 of the framework is an opening 20 that communicates with an internal compartment. Each two adjacent lateral portions 40 provide receiving slots 18 along each lateral face. Each pair of receiving slots 18 may start inward of one end of the cuboid 10 and terminate at the other end so that a void defined by the pair of receiving slots 18 results in a cutout of that other end. Along that end, the cutout may have a greater volume, as shown in FIG. 4. The resulting recess is defined by shoulders/stop 28. Each pair of receiving slots 18 may define tracks on which a display surface 16 may slide.

Complementarily, one end of each display surface 16 may provide a handle 14 dimensioned and shaped to snugly fill this larger recess, wherein the handle 14 is stopped on the shoulders 28. The handle may have a thickness greater than the remainder of the display surface 16 by approximately a three to one ratio. As a result, the display surfaces 16 can be slid in and out of the receiving slots 18 between a closed condition and an opened condition affording access to the internal storage compartment 20.

A method of making the present invention may include the following. A manufacturer can make the structural components of the present invention out of various materials (wood, metal, or plastic), and they could also have several different materials for the customizable areas (chalkboard, dry erase, etc.). From there the manufacturer would have to figure out a binding mechanism to put it all together.

Figure 5:
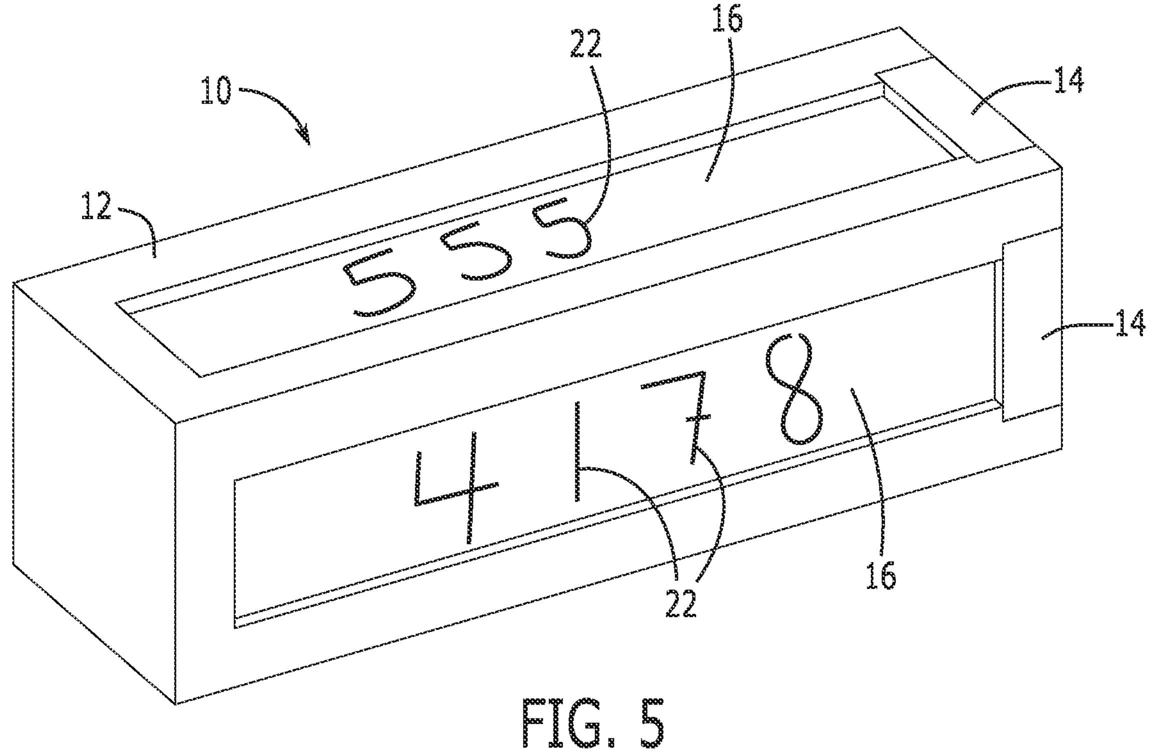
FIG. 5 is a perspective view of an exemplary embodiment of the present invention, shown in use.

A method of using the present invention may include the following. The customizable cuboid 10 disclosed above may be provided. A user would use the customizable cuboid 10 to teach important contact information to a child or someone with a learning disability. Removing each display surface 16 enables users to erase and write portions of the contact information 22. Referring to FIG. 5, a user could write the first three digits (first portion) of a contact phone number on a first display surface 16 (e.g., “555”) and then write the last four digits of the contact phone number (second portion) on a second display surface 16, thereby breaking up the recognition and memorization of the seven-digit phone number (e.g., set of contact information) its two easier-to-retain portions.

As used in this application, the term “about” or “approximately” refers to a range of values within plus or minus 10% of the specified number. And the term “substantially” refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term “aligned” means parallel, substantially parallel, or forming an angle of less than 35.0 degrees. For purposes of this disclosure, the term “transverse” means perpendicular, substantially perpendicular, or forming an angle between 55.0 and 125.0 degrees. Also, for purposes of this disclosure, the term “length” means the longest dimension of an object. Also, for purposes of this disclosure, the term “width” means the dimension of an object from side to side. For the purposes of this disclosure, the term “above” generally means superjacent, substantially superjacent, or higher than another object although not directly overlying the object. Further, for purposes of this disclosure, the term “mechanical communication” generally refers to components being in direct physical contact with each other or being in indirect physical contact with each other where movement of one component affect the position of the other.

The use of any and all examples, or exemplary language (“e.g.,” “such as,” or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as “first,” “second,” “top,” “bottom,” “up,” “down,” and the like, are words of convenience and are not to be construed as limiting terms unless specifically stated to the contrary.

It should be understood, of course, that the foregoing relates to exemplary embodiments of the invention and that modifications may be made without departing from the spirit and scope of the present invention.

What is claimed is:

1. A cuboid teaching tool comprising:

a polygonal shaped teaching tool having four substantially identical lateral faces, wherein each lateral face comprises:

a length in a range between approximately nine and approximately fifteen inches;

a height in a range between approximately three and approximately six inches, the height configured so that each lateral face provides a shared girth facilitating manipulation of the teaching tool by a human user sequentially presenting two or more of said four lateral faces;

two opposing lateral frame elements provide a pair of tracks;

a display surface slidable along the pair of tracks between a closed condition and an opened condition communicating an external environment with an internal compartment defined by the teaching tool;

each display surface configured to receive erasable written information; and wherein the display surface is recessed relative to the two opposing lateral frame elements so as to provide boundaries to the erasable written information presented by way of the display surface.

2. The cuboid teaching tool of claim 1, wherein each pair of tracks is defined by a pair of receiving slots.

3. The cuboid teaching tool of claim 2, wherein each pair of tracks starts inward from a first end of the teaching tool and terminates at a second end of the teaching tool.

4. The cuboid teaching tool of claim 3, wherein adjacent the second end, each pair of receiving slots define a pair of shoulders by discontinuously offsetting.

5. The cuboid teaching tool of claim 4, wherein each display surface ends in a handle that abuts the respective pair of shoulders in the closed condition, and wherein the handle has a thickness greater than a remainder of the display surface by approximately a three to one ratio.

6. The cuboid teaching tool of claim 5, further comprising a knob along an end face.

7. A method of teaching a set of related information, the method comprising:

providing a polygonal shaped teaching tool having four substantially equal lateral faces, each lateral face comprising:

a length of approximately nine and approximately fifteen inches;

a height of approximately three and approximately six inches, the height configured so that each lateral face provides a shared girth facilitating manipulation of the teaching tool by a human user sequentially presenting two or more of the four substantially equal lateral faces;

a display surface slidable along tracks between a closed condition and an opened condition that provides access to an internal compartment defined by the polygonal shaped teaching tool writing erasable successive portions of the set of related information on at least two successive substantially equal lateral faces of the four substantially equal lateral faces, respectively; and by singlehandedly manipulating the teaching tool so as to sequentially present the successive portions of the set of related information written on the at least two successive substantially equal lateral faces.

8. The method of claim 7, wherein a first portion of the successive portions is an area code of a phone number, wherein a second portion of the successive portions is a first three digits of the phone number, and wherein third portion of the successive portions is a last four digits of the phone number.

* * * * *